(12) United States Patent
Siani

(10) Patent No.: US 6,318,858 B1
(45) Date of Patent: Nov. 20, 2001

(54) EYEGLASS FRAME ADJUSTMENT DEVICE

(76) Inventor: John V. Siani, 1736 Long Woods Rd., Tobyhanna, PA (US) 18466

( * ) Notice: Subject to any disclaimer, the term of this patent is extended or adjusted under 35 U.S.C. 154(b) by 0 days.

(21) Appl. No.: 09/833,955

(22) Filed: Apr. 12, 2001

(51) Int. Cl.$^7$ ...................................................... G02C 5/14
(52) U.S. Cl. ........................... 351/123; 351/111; 351/120
(58) Field of Search ..................................... 351/123, 120, 351/111, 122, 121, 119, 41; 24/3.3

(56) References Cited

U.S. PATENT DOCUMENTS 4,389,102 * 6/1983 Piampiano ............................ 351/123

* cited by examiner

Primary Examiner—Hung Xuan Dang

(74) Attorney, Agent, or Firm—Kenneth P. Glynn; Deirdra M. Meagher

(57) ABSTRACT

The present invention is a device for adjusting height of an arm of an eyeglasses frame relative to a wearer's ear, which includes a main element and a locking element. The main body has a top, sides, a back and a bottom, and as a recess located at the top and adapted to receive a frame arm. The main body has height adjustment means. The locking element is adapted to attach to the top of the main element so as to hold a frame arm in the recess of the main element when a frame arm is located therein and includes one of a male component and a female component of an interconnecting attachment means which attaches the main element sides to the other of the male component and the female component. The locking element may be a snap-on clip. The main element height adjustment means is created by having a bottom length which is elongated over the bottom of the main element, and a distance, measured from the recess and being perpendicular from the recess to the bottom. The distance varies along the bottom length so as to permit a wearer to select a resting point of the bottom on a wearer's ear at a predetermined desirable height.

20 Claims, 4 Drawing Sheets

EYEGLASS FRAME ADJUSTMENT DEVICE

BACKGROUND OF THE INVENTION

1. Field of the Invention

The present invention relates to eyeglass frames, and, more particularly, to adjustments to the distance between a frame arm located in the recess and a wearer's ear. The adjustment may be accomplished by a variable distance, measured from a recess on the device and being perpendicular from the recess to a bottom of the device. The distance varies along an elongated bottom length so as to permit a wearer to select a resting point of the bottom on a wearer's ear at a predetermined desirable height. In addition, the adjustment may be accomplished by breakaway sections on the device.

2. Information Disclosure Statement

Currently eyeglasses are made such that the left arm of eyeglasses and the right arm of eyeglasses are at the same height relative to each other. Adjustments may be made to the arms and the center piece resting upon the nose, to accommodate differences in height of one's ear lobes. However, to those individuals who have a marked difference in the height of the ear lobes, these adjustments prove ineffective in two ways.

First, the adjustments leave room for error both in the height adjustment and in the feel of the eyeglasses. A short interval adjustment in an ophthalmologist or optometrist's office does not allow a wearer of eyeglasses enough time to fully assess the adjustments. When he returns home, the need to readjust the eyeglasses may become evident.

Second, when eyeglasses are extensively twisted through adjustments to the curved back arm, front portions of the arm and the nose piece, the frame becomes less secure. The movement of the frame causes tension on various parts, and may lead to breakage of the frame and/or instability of the frame.

Thus, there is a need for a device which will adjust the height of an arm of eyeglasses so that both sides of the eyeglasses have the same height relative to the face. The present invention solves this need by creating a device which rests on an ear and provides a variable height adjustment. Since the device operates essentially independently of adjustments to the frame arm, the life of the eyeglasses will be prolonged. The present invention further allows for adjustment to height of the arms outside of an ophthalmologist or optometrist's office, at a time convenient for the wearer.

Thus, the present fulfills a need and the present invention system is neither taught nor rendered obvious by prior art.

SUMMARY OF THE INVENTION

The present invention is a device for adjusting height of an arm of an eyeglasses frame relative to a wearer's ear, which includes a main element and a locking element. The main body has a top, sides, a back and a bottom, as well as a recess located at the top and adapted to receive a frame arm. In addition, the main body has height adjustment means adapted to adjust distance between a frame arm located in the recess and a wearer's ear.

The locking element is adapted to attach to the top of the main element so as to hold a frame arm in the recess of the main element when a frame arm is located therein. The locking element includes one of a male component and a female component of an interconnecting attachment means which attaches the main element sides to the other of the male component and the female component. The locking element may be a snap-on clip.

The main element height adjustment means is created by having a bottom length which is elongated over the bottom of the main element, and a distance, measured from the recess and being perpendicular from the recess to the bottom. The distance varies along the bottom length so as to permit a wearer to select a resting point of the bottom on a wearer's ear at a predetermined desirable height.

An alternative embodiment main element height adjustment means includes a plurality of segments which may be selectively removed to adjust distance between the recess and the main element bottom. The locking element in this embodiment is attached on the segments which have not be removed.

In a preferred embodiment of the present invention, the main element recess is substantially horizontal, while the bottom is non-horizontal. Moreover, an acute angle is formed between the recess and the bottom. The main element back is curved downwardly at least in part, to accommodate a curved end of a frame arm.

In another embodiment of the present invention, the main element is rectangular-shaped and includes a U-shaped aperture for receiving a curved end portion of eyeglasses. In this embodiment, the height adjustment means is the plurality of removable sections.

The main element and the locking element are made of hypoallergenic material, which includes a hypoallergenic plastic.

BRIEF DESCRIPTION OF THE DRAWINGS

The present invention should be more fully understood when the specification herein is taken in conjunction with the drawings appended hereto wherein:

FIG. 2 shows a perspective view of the present invention main element shown in FIG. 1 with a locking element attached to the main element while

FIG. 4 shows a transparent side view of the present invention device shown in FIG. 2, while

DETAILED DESCRIPTION OF THE PRESENT INVENTION

The present invention is a device for adjusting height of an arm of an eyeglasses frame relative to a wearer's ear, which includes a main element and a locking element. The main body has a top, sides, a back and a bottom, as well as a recess located at the top and adapted to receive a frame arm. In addition, the main body has height adjustment means adapted to adjust distance between a frame arm located in the recess and a wearer's ear.

The locking element is adapted to attach to the top of the main element so as to hold a frame arm in the recess of the main element when a frame arm is located therein. The locking element includes one of a male component and a female component of an interconnecting attachment means which attaches the main element sides to the other of the male component and the female component. The locking element may be a snap-on clip.

The main element height adjustment means is created by having a bottom length which is elongated over the bottom of the main element, and a distance, measured from the recess and being perpendicular from the recess to the bottom. The distance varies along the bottom length so as to permit a wearer to select a resting point of the bottom on a wearer's ear at a predetermined desirable height.

An alternative embodiment main element height adjustment means includes a plurality of segments which may be selectively removed to adjust distance between the recess and the main element bottom. The locking element in this embodiment is attached on the segments which have not be removed.

In a preferred embodiment of the present invention, the main element recess is substantially horizontal, while the bottom is non-horizontal. Moreover, an acute angle is formed between the recess and the bottom. The main element back is curved downwardly at least in part, to accommodate a curved end of a frame arm.

In another embodiment of the present invention, the main element is rectangular-shaped and includes a U-shaped aperture for receiving eyeglasses. In this embodiment, the height adjustment means is a plurality of removable sections.

The main element and the locking element are made of hypoallergenic material, which includes a hypoallergenic plastic. The device is doubly adaptable being able to adjust to different size eyeglasses, as well as being able to adjust to different heights.

Figure 1:
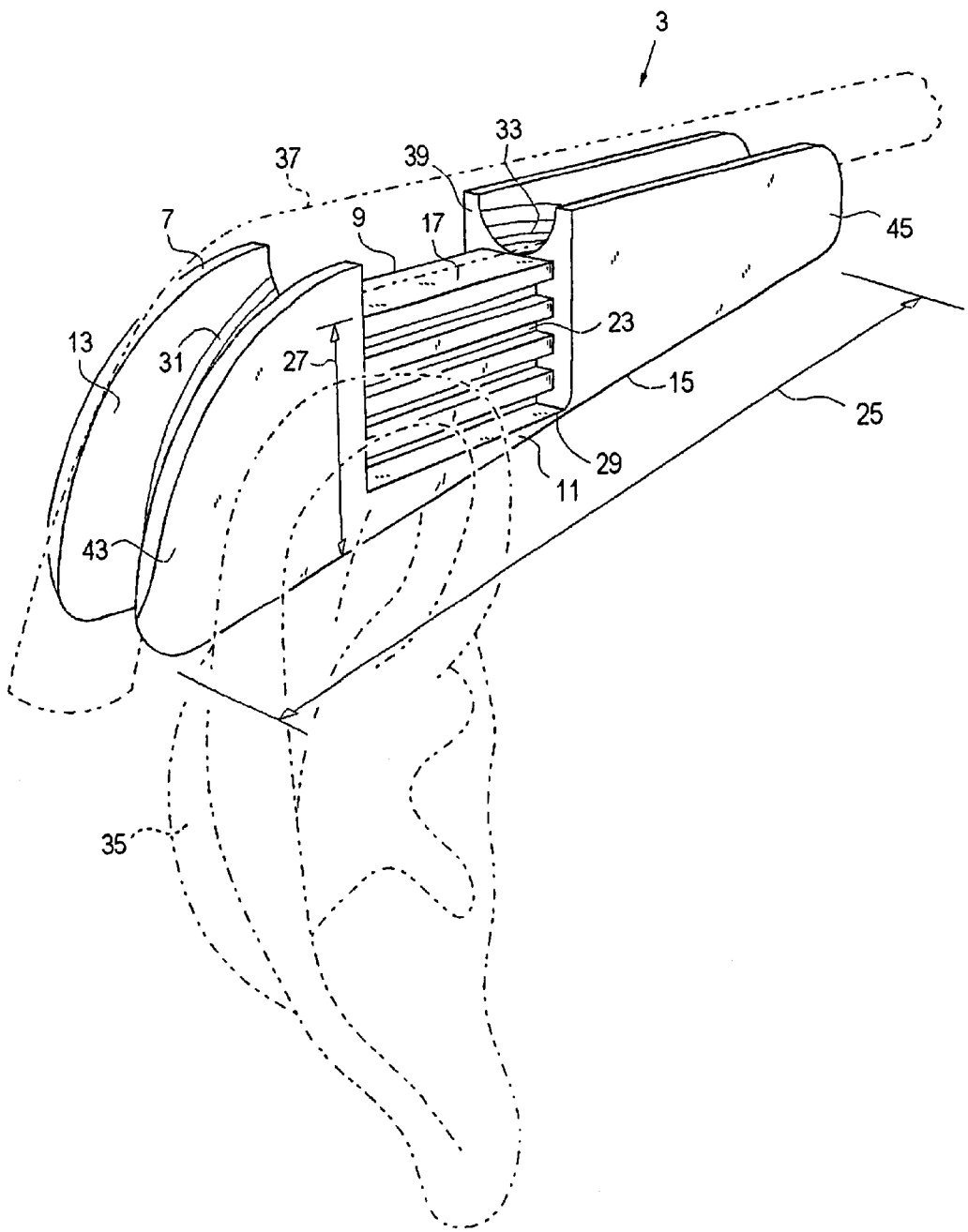
FIG. 1 shows a perspective view of a present invention main element.
Figure 2:
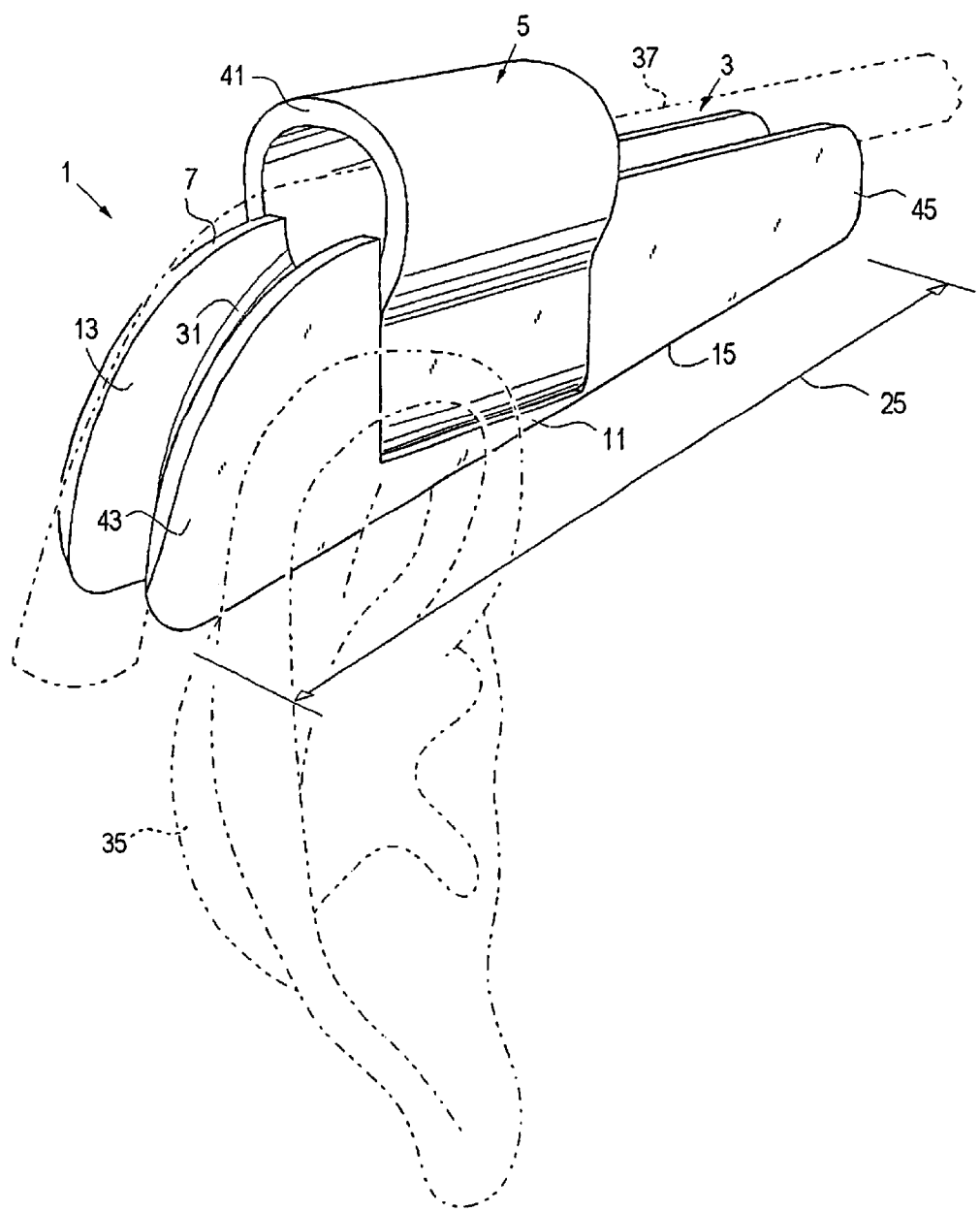
Figures 3, 5:
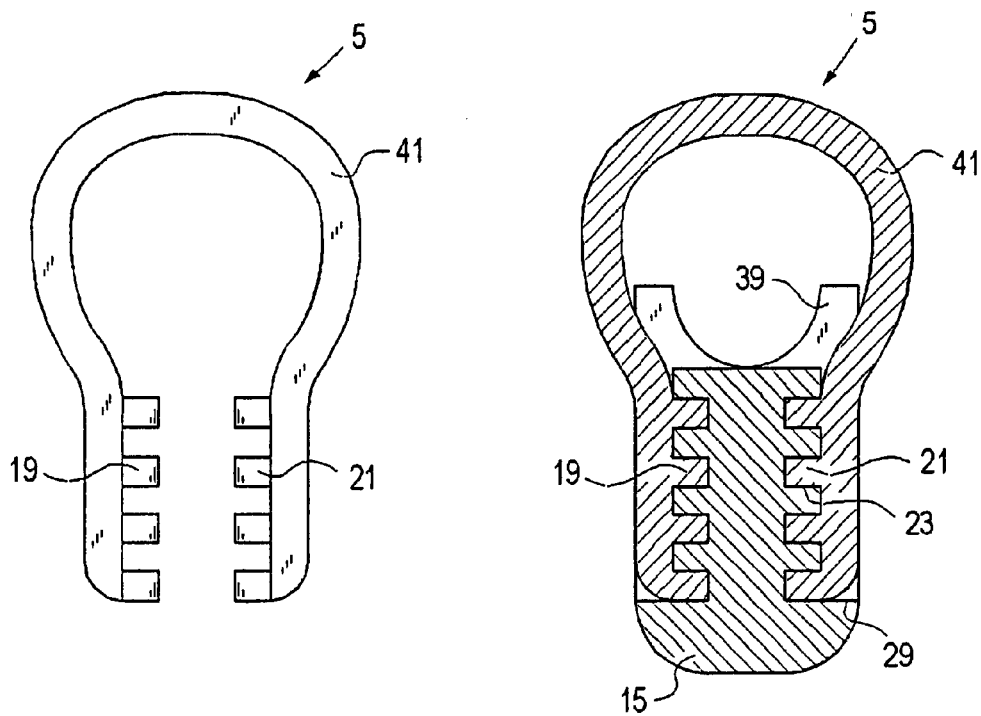
FIG. 3 shows a side view of the locking element shown in FIG. 2.
FIG. 5 shows a cut view along the axis A—A thereof.

Referring now to FIGS. 1, 2 and 3, there is shown a present invention device 1 for adjusting height of an arm of an eyeglasses frame relative to a wearer's ear 35. The device 1 includes a main element 3 and a locking element 5. The main body has a top 7, sides 9 and 11, a back 13, a front, 45 and a bottom 15, as well as a recess 17 located at the top 7 and adapted to receive a frame arm 37. In addition, the main body has height adjustment means adapted to adjust distance between the frame arm 37 located in the recess 17 and the wearer's ear 35.

The locking element 5 is adapted to attach to the top 7 of the main element 3 so as to hold the frame arm 37 in the recess 17 of the main element 3 when the frame arm 37 is located therein. The locking element 5 includes one of a male component and a female component 19, 21 of an interconnecting attachment means which attaches the main element sides 9 and 11 to the other of the male component 23 and the female component. The locking element 5 may be a snap-on clip, as illustrated in FIG. 2 and FIG. 3.

The main element height adjustment means is created by having a bottom length 25 which is elongated over the bottom 15 of the main element 3, and a distance 27, measured from the recess 17, and being perpendicular from the recess 17 to the bottom 15. The distance 27 varies along the bottom length 25 so as to permit a wearer to select a resting point of the bottom 15 on the wearer's ear 35 at a predetermined desirable height.

In the above-identified preferred embodiment of the present invention, the main element 3 recess 17 is substantially horizontal, while the bottom 15 is non-horizontal. Moreover, an acute angle 29 is formed between the recess 17 and the bottom 15. The main element back 13 is curved downwardly, at least in part, to accommodate a curved end of the frame arm 37.

The main element front 45 includes a U-shaped portion 39, which is a resting place for the frame arm 37. In addition, there is a curved portion 33 within the front 45 for retaining the frame arm 37. The main element back 13 includes two approximately pie-shaped portions 13 and 45, which have a curved portion 31 situated in between the pie-shaped portions 13 and 45. The curved portion is sized and shaped for retaining the eyeglass arm frame 37.

Figure 4:
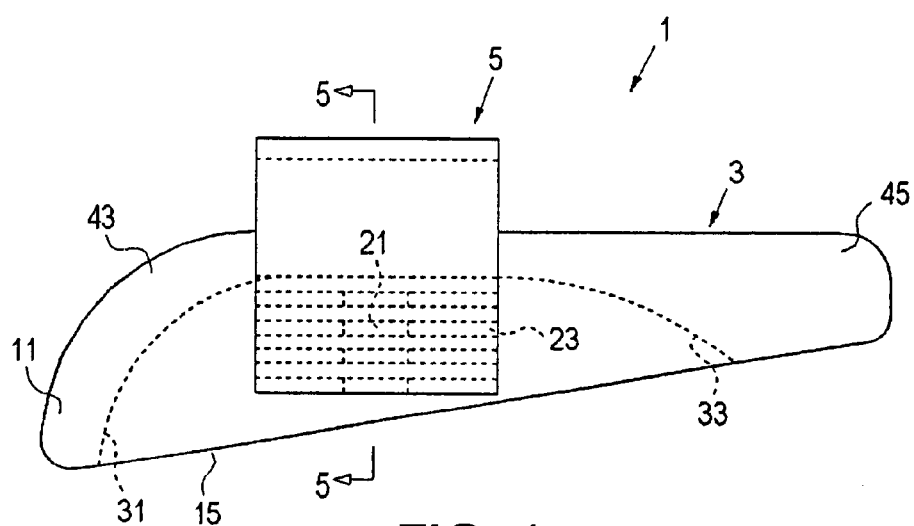

Referring now to FIG. 4 and FIG. 5, there is shown a transparent side view of the present invention device 1 shown in FIG. 2, and a cut view along the axis 5—5 thereof, respectively. As shown in the figures, there is a first curved portion 31 extending from the recess 17 to the back 13 of the main element 3, and being sized and shaped to accommodate an eyeglass curved end of an arm. The curved side of eyeglasses may move from the back curved inner portion 31 to the back 13 of the device 1. In addition, there is a front curved inner portion 33 extending from the recess 17 to a front of the main element 3.

In operation, an eyeglass wearer places the device 1 under the frame arm 37 of eyeglasses to be worn and attaches the clip 5 to the recess 17 so that the frame arm 37 remains attached to the device 1. One then positions the eyeglasses within the device 1 so that the device 1 may be placed on one's ear 35 to obtain the desired height adjustment.

As the device 1 is moved backward on the ear, the distance 27 from the recess 17 to the bottom 15 changes so that various height adjustments to the frame arm 37 may be obtained. Because the distance 27 from the recess 17 to the bottom 15 varies over the bottom length 25, the eyeglasses arm 27 will be at a different heights relative to the ear 35 as the device 1 is moved along the ear 35.

Figure 6:
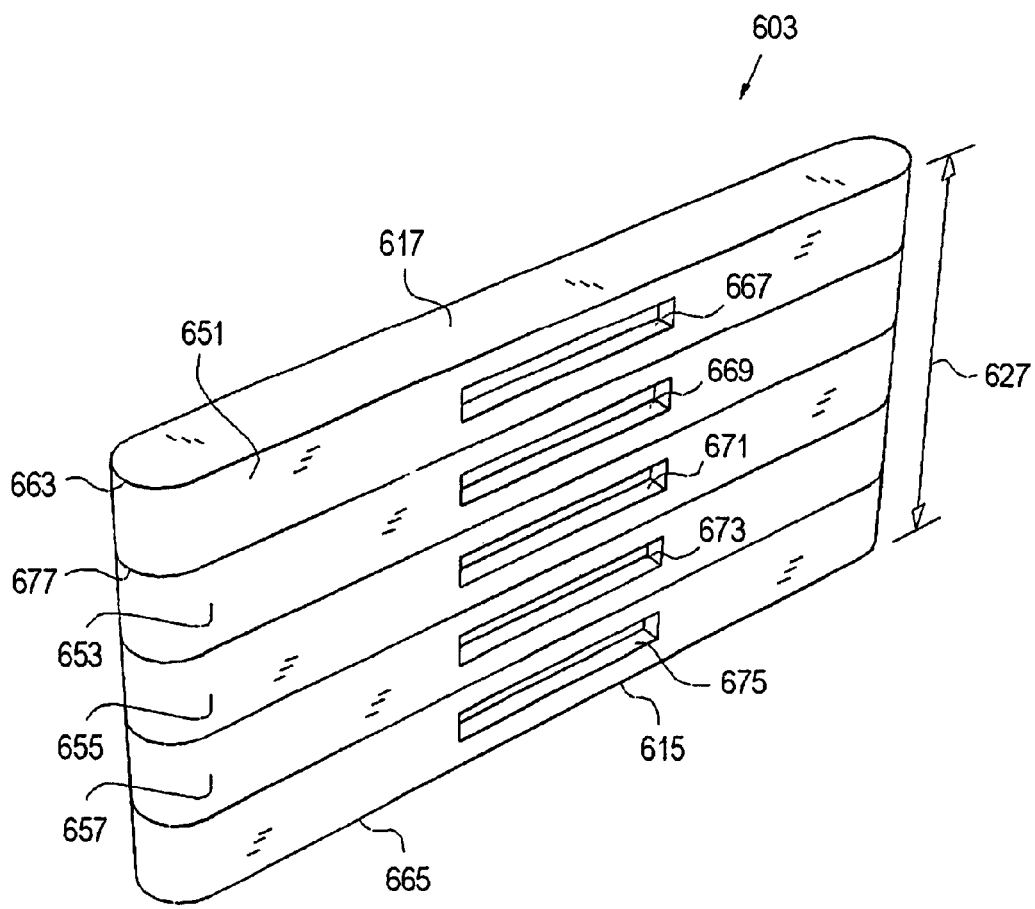
FIG. 6 shows an alternative embodiment of a present invention main element.

Referring now to FIG. 6, there is shown an alternative embodiment main element 603 The main element includes a plurality of segments 651, 653, 655 and 657, which may be selectively removed to adjust distance 627 between a recess 617 and a main element bottom 665. Each segment 651 and 653 includes a U-shaped portion adapted to rest an end part of a curved eyeglass frame arm.

A locking element, not shown, is attached on the segments which have not be removed through one of a male component 667, 669, 671, 673 and 675 and a female component. The other of the male component and female component is located on the locking element. The main element 603 rests on one's ear to cause a change in the height of the frame of the eyeglasses.

As the device 601 has each segment 651, 653, 655, 657, 659 and 661 removable, the distance 627 from the recess 617 to the bottom 615 changes so that various height adjustments may be obtained in relation to the segments removed. Because the distance 627 from the recess 617 to the bottom 615 varies as the segment and/or segments 651, 653, 655, and 657 are removed, the eyeglasses arm will be at a different height relative to the ear as the device 1.

Obviously, numerous modifications and variations of the present invention are possible in light of the above teachings. For example, various-shaped main elements, and locking means known or will be known in the art, are envisioned within the current invention. It is, therefore, understood that within the scope of the appended claims, the invention may be practiced otherwise than as specifically described herein.

What is claimed is:

1. A device for adjusting height of an arm of an eyeglasses frame relative to a wearer's ear, which comprises:

(a) a main element having a top, sides, a back and a bottom, and having a recess located at said top and adapted to receive a frame arm, and having height adjustment means adapted to adjust distance between a frame arm located in said recess and a wearer's ear; and, (b) a locking element adapted to attach to said top of said main element so as to hold a frame arm in said recess of said main element when a frame arm is located therein.

2. The device of claim 1 wherein said main element height adjustment means is created by having a bottom length which is elongated over said bottom, and a distance, measured from said recess and perpendicular from said recess to said bottom, which varies along said bottom length so as to permit a wearer to select a resting point of said bottom on a wearer's ear at a predetermined desirable height.

3. The device of claim 2 wherein said main element recess is substantially horizontal, said bottom is non-horizontal, and an acute angle is formed between said recess and said bottom.

4. The device of claim 3 wherein said main element and said locking element are made of hypoallergenic material.

5. The device of claim 1 wherein said main element sides include one of a male component and a female component of an interconnecting attachment means and said locking element includes the other of said male component and said female component of said interconnecting attachment means.

6. The device of claim 1 wherein said locking element is a snap-on clip.

7. The device of claim 5 wherein said locking element is a snap-on clip.

8. The device of claim 6 wherein said main element and said locking element are made of hypoallergenic material.

9. The device of claim 1 wherein said main element back is curved downwardly, at least in part, to accommodate a curved end of a frame arm.

10. The device of claim 1 wherein said main element height adjustment means is a plurality of segments which may be selectively removed to adjust distance between said recess and said main element bottom.

11. The device of claim 10 wherein said main element sides include one of a male component and a female component of an interconnecting attachment means and said locking element includes the other of said male component and said female component of said interconnecting attachment means.

12. The device of claim 11 wherein said locking element is a snap-on clip.

13. The device of claim 10 wherein said locking element is a snap-on clip.

14. The device of claim 13 wherein said main element and said locking element are made of hypoallergenic material.

15. The device of claim 10 wherein said main element and said locking element are made of hypoallergenic material.

16. The device of claim 10 wherein said main element is rectangular-shaped.

17. The device of claim 16 wherein said main element further includes a U-shaped portion on each of said plurality of segments.

18. The device of claim 1 wherein said main element and said locking element are made of hypoallergenic material.

19. The device of claim 1 wherein said back is substantially triangular-shaped.

20. The device of claim 1 wherein said main element further includes at least one curved inner portion.

* * * * *